United States Patent
Kuo et al.

(10) Patent No.: US 10,223,983 B2
(45) Date of Patent: Mar. 5, 2019

(54) BRIGHTNESS COMPENSATION METHOD, SYSTEM AND DISPLAY PANEL IN DEMURA SYSTEM

(71) Applicant: Shenzhen China Star Optoelectronics Technology Co., Ltd., Shenzhen, Guangdong (CN)

(72) Inventors: Ping-sheng Kuo, Guangdong (CN); Liwei Zhu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 268 days.

(21) Appl. No.: 15/029,086

(22) PCT Filed: Jan. 14, 2016

(86) PCT No.: PCT/CN2016/070901
§ 371 (c)(1),
(2) Date: Apr. 13, 2016

(87) PCT Pub. No.: WO2017/107264
PCT Pub. Date: Jun. 29, 2017

(65) Prior Publication Data
US 2018/0096659 A1    Apr. 5, 2018

(30) Foreign Application Priority Data
Dec. 21, 2015    (CN) .......................... 2015 1 0961480

(51) Int. Cl.
*G09G 3/36* (2006.01)
*H05B 37/02* (2006.01)
(Continued)

(52) U.S. Cl.
CPC ................. *G09G 3/36* (2013.01); *G02F 1/13* (2013.01); *G09G 3/3233* (2013.01);
(Continued)

(58) Field of Classification Search
CPC .......... G09G 3/36; G09G 3/3233; G02F 1/13; H05B 37/02
See application file for complete search history.

(56) References Cited

U.S. PATENT DOCUMENTS 9,142,190 B2 *   9/2015   Wu .......................... G09G 3/20
9,357,209 B2 *   5/2016   Kim ................... H04N 21/4318
(Continued)

OTHER PUBLICATIONS

Douglas A. Kerr, Derivation of the "Cousign Fourth" Law for Fallout of Illuminance Across a Camera Image, May 1, 2007, Issue 4, pp. 1-12, dougkerr.net/Pumpkin/articles/CosineFourthFallout.pdf.*

*Primary Examiner* — Afroza Chowdhury
(74) *Attorney, Agent, or Firm* — Andrew C. Cheng

(57) ABSTRACT

The present invention provides a brightness compensation method, a system and a display panel in a Demura system. The method comprises obtaining an included angle θ between a connection line of a pixel dot and a center point of a camera lens and a horizontal line as a camera is fixed; obtaining a brightness value f(θ) corresponding to the θ according to a pre-stored angle-brightness relationship; obtaining a correction brightness value of the pixel dot according to a calculation of the f(θ) and a default formula, and performing brightness compensation to the display panel according to the brightness value of the pixel dot after correction. The technical solution provided by the present invention can reduce the influence of the view angle to the brightness and the influence of $\cos^4 \theta$ to the brightness, and thus, it possesses the benefit of the brightness decay offset reduction.

4 Claims, 4 Drawing Sheets

(51) Int. Cl.
*G02F 1/13* (2006.01)
*G09G 3/3233* (2016.01)
*H05B 33/08* (2006.01)
*G09G 3/00* (2006.01)

(52) U.S. Cl.
CPC ......... *H05B 33/0845* (2013.01); *H05B 37/02* (2013.01); *G09G 3/006* (2013.01); *G09G 2320/0285* (2013.01); *G09G 2320/068* (2013.01); *G09G 2320/0693* (2013.01); *G09G 2360/145* (2013.01)

(56) References Cited

U.S. PATENT DOCUMENTS

2012/0038794 A1* 2/2012 Kumagai ............. H04N 5/3572
   348/234
2015/0146017 A1* 5/2015 Kim ................... H04N 21/4318
   348/189
2016/0163246 A1* 6/2016 Lee ..................... G09G 3/2003
   345/690

* cited by examiner

BRIGHTNESS COMPENSATION METHOD, SYSTEM AND DISPLAY PANEL IN DEMURA SYSTEM

CROSS REFERENCE

This application claims the priority of Chinese Patent Application No. 201510961480.2, entitled "Brightness compensation method, system and display panel in Demura system", filed on Dec. 21, 2015, the disclosure of which is incorporated herein by reference in its entirety.

FIELD OF THE INVENTION

The present invention relates to a display field, and more particularly to a brightness compensation method, a system and a display panel in a Demura system.

BACKGROUND OF THE INVENTION

The panel is also so called the LCD (Liquid Crystal Display), which is a common electronic display device at present. The present Demura system of the LCD performs compensation according to the brightness.

In the solution of realizing prior art, the following technical issue is found:

In prior art, the Demura system generally performs compensation according to the brightness of the camera. However, in prior art, there will be offset of the brightness due to the angle as the camera obtains values of the pixel brightness. In the illustration of the 50 inches LCD, the brightnesses of two sides (indicated with the dotted ellipse area in FIG. 1) will have decay about 6% at the angle of 10°. As shown in FIG. 1, for the liquid crystal screen, the brightnesses of two sides will be darker. The larger the size of the liquid crystal screen is, the more serious the brightness decay becomes.

SUMMARY OF THE INVENTION

Provided is a brightness compensation method in a Demura system, and the brightness compensation method in the Demura system corrects a brightness value according to offset angle to reduce the influence of the angle to the brightness decay. Thus, the method possesses benefits of good compensation result.

First, the present invention provides a brightness compensation method in a Demura system, wherein the method comprises:

obtaining an included angle θ between a connection line of a pixel dot and a center point of a camera lens and a horizontal line as a camera is fixed;

obtaining a brightness value f(θ) corresponding to the θ according to a pre-stored angle-brightness relationship;

obtaining a correction brightness value of the pixel dot according to a calculation of the f(θ) and a default formula, and the default formula comprises:

$$Et_{dB,\theta°} = \frac{E_{dB,\theta°}}{f(\theta)}$$

$$E_{dB,\theta°} = \frac{Ls * A_s * \cos^4\theta}{Z^2}$$

wherein $Et_{dB,\theta°}$ is the brightness value of the pixel dot after correction, and $E_{dB,\theta°}$ is a brightness value of the pixel dot before correction; Z is a horizontal distance from a display panel to the center point of the camera lens; Ls is a radiation value of the pixel dot, and $A_s$ is an occupied area of the pixel dot in the display panel;

performing brightness compensation to the display panel according to the brightness value of the pixel dot after correction.

With combination of the brightness compensation method in the Demura system provided first, in the first possible solution of first, the angle-brightness relationship specifically comprises:

a list of angle and brightness or a function of angle-brightness.

With combination of the first possible solution of first and in the second possible solution of first, as the relationship of the angle and the brightness comprises the list of angle and brightness, the step of obtaining the brightness value f(θ) corresponding to the θ according to the pre-stored angle-brightness relationship specifically comprises:

if the θ can be queried in the pre-stored list of angle and brightness, then querying the brightness value f(θ) corresponding to the θ in the pre-stored list of angle and brightness;

if the θ cannot be queried in the pre-stored list of angle and brightness, then querying brightness values f(θ1) and f(θ2) corresponding to θ1 and θ2 adjacent the θ in the pre-stored list of angle and brightness, and calculating the f(θ) by interpolation.

With combination of the first possible solution of first and in the second possible solution of first, as the relationship of the angle and the brightness comprises the function of angle-brightness, the step of obtaining the brightness value f(θ) corresponding to the θ according to the pre-stored angle-brightness relationship specifically comprises:

obtaining a brightness value f(θ) corresponding to the θ according to the pre-stored function of angle and brightness.

Second, provided is a Demura system, and the system comprises:

an angle obtaining unit, obtaining an included angle θ between a connection line of a pixel dot and a center point of a camera lens and a horizontal line as a camera is fixed;

a calculating unit, obtaining a brightness value f(θ) corresponding to the θ according to a pre-stored angle-brightness relationship;

a correcting unit, obtaining a correction brightness value of the pixel dot according to a calculation of the f(θ) and a default formula, and the default formula comprises:

$$Et_{dB,\theta°} = \frac{E_{dB,\theta°}}{f(\theta)}$$

$$E_{dB,\theta°} = \frac{Ls * A_s * \cos^4\theta}{Z^2}$$

wherein $Et_{dB,\theta°}$ is the brightness value of the pixel dot after correction, and $E_{dB,\theta°}$ is a brightness value of the pixel dot before correction; Z is a horizontal distance from a display panel to the center point of the camera lens; Ls is a radiation value of the pixel dot, and $A_s$ is an occupied area of the pixel dot in the display panel;

a compensating unit, performing brightness compensation to the display panel according to the brightness value of the pixel dot after correction.

With combination of the Demura system provided second, in the first possible solution of second, the angle-brightness relationship specifically comprises:

a list of angle and brightness or a function of angle-brightness.

With combination of the first possible solution of second and in the second possible solution of second, as the relationship of the angle and the brightness comprises the list of angle and brightness, the calculating unit is specifically employed for:

if the θ can be queried in the pre-stored list of angle and brightness, then querying the brightness value f(θ) corresponding to the θ in the pre-stored list of angle and brightness;

if the θ cannot be queried in the pre-stored list of angle and brightness, then querying brightness values f(θ1) and f(θ2) corresponding to θ1 and θ2 adjacent the θ in the pre-stored list of angle and brightness, and calculating the f(θ) by interpolation.

With combination of the first possible solution of second and in the third possible solution of second, as the relationship of the angle and the brightness comprises the function of angle-brightness, the calculating unit is specifically employed for:

obtaining a brightness value f(θ) corresponding to the θ according to the pre-stored function of angle and brightness.

Third, provided is a display panel, and the display panel comprises the Demura system provided second, the first possible solution of second, the second possible solution of second or the third possible solution of second.

Fourth, provided is a display device, and the display device comprises a display panel, and the display panel comprises the Demura system provided second, the first possible solution of second, the second possible solution of second or the third possible solution of second.

According to the brightness compensation method, system and display panel in Demura system provided in the embodiments, the embodiments divide the brightness value by the f(θ) to reduce the influence of the θ to the brightness decay. Proved by the experiment, the technical solution utilizing the present invention can reduce the influence of the view angle to the brightness and the influence of cost to the brightness. Therefore, the brightness decay offset is obviously reduced, and it possesses the benefit of the brightness decay reduction.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

Figure 1:
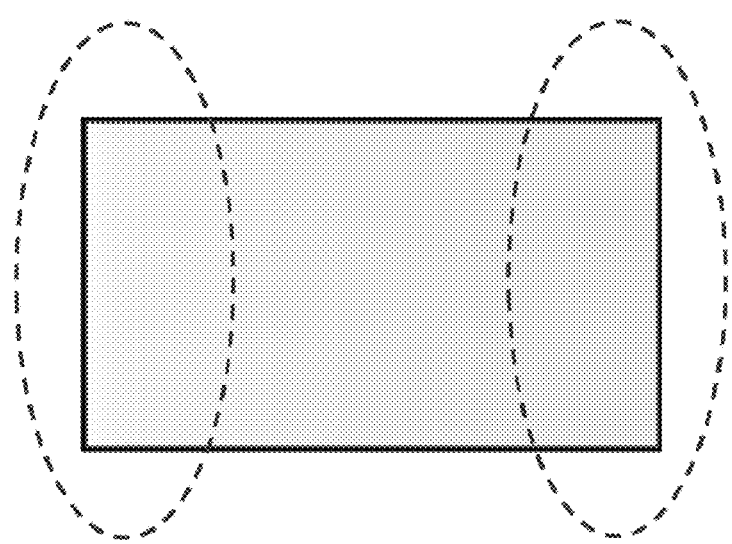
FIG. 1 is a diagram of the display panel brightness according to prior art.
Figure 2:
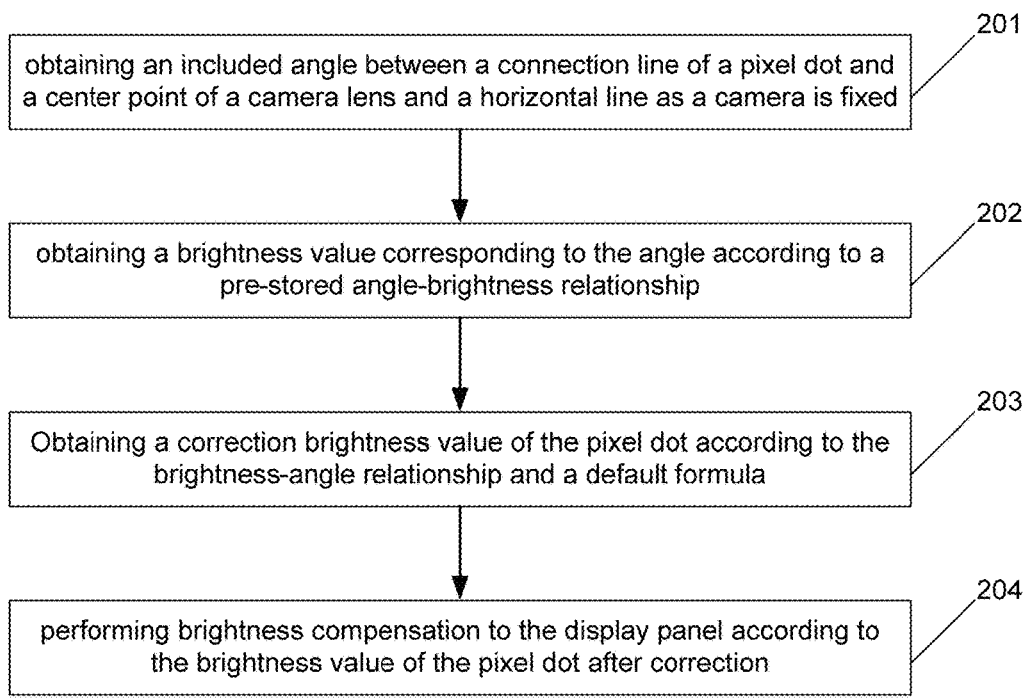
FIG. 2 is a flowchart of a brightness compensation method in a Demura system in the first preferred embodiment of the present invention.
Figure 3:
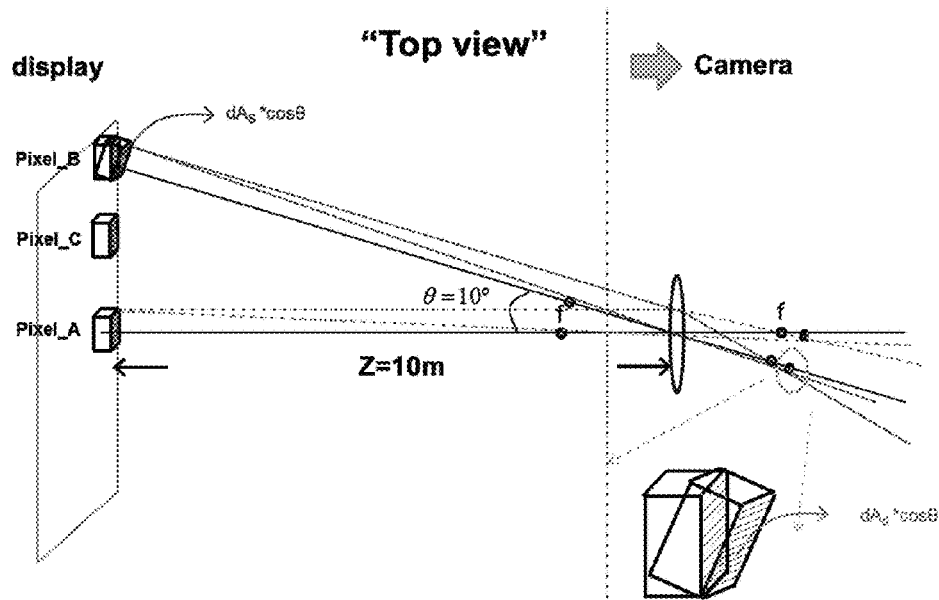
FIG. 3 is a diagram of the parameter and pixel distribution in the first preferred embodiment of the present invention.

Please refer to FIG. 2. FIG. 2 shows a brightness compensation method in a Demura system in the first preferred embodiment of the present invention. The method is accomplished with the display penal or the display device. As shown in FIG. 2, the method comprises steps of:

step S201, obtaining an included angle θ between a connection line of a pixel dot and a center point of a camera lens and a horizontal line as a camera is fixed;

The θ in the aforesaid step S201 as shown in FIG. 3, 10° is illustrated for the angle of the θ in FIG. 3. In practical application, the angle of the θ can be other values, such as 5°, 6°.

Step S202, obtaining a brightness value f(θ) corresponding to the θ according to a pre-stored angle-brightness relationship;

The angle-brightness relationship in the aforesaid step S202 can have many express forms. The specific embodiment of the present invention does not restrict the specific express form of the angle-brightness relationship. For instance, in one embodiment of the first preferred embodiment of the present invention, the angle-brightness relationship can be the curve function of the angle-brightness relationship. Certainly, in the practical application, other embodiments can be utilized. As an illustration, the angle-brightness relationship is to establish the list of the angle-brightness relationship. Certainly, in the practical application, other express forms can be utilized. The repeated description is omitted here.

Step S203, obtaining a correction brightness value of the pixel dot according to a calculation of the f(θ) and a default formula;

$$Et_{dB,\theta°} = \frac{E_{dB,\theta°}}{f(\theta)};$$

$$E_{dB,\theta°} = \frac{Ls * A_s * \cos^4\theta}{Z^2}$$

$Et_{dB,\theta°}$ can be the brightness value of the pixel dot after correction, and $E_{dB,\theta°}$ can be a brightness value of the pixel dot before correction; Z can be a horizontal distance from a display panel to the center point of the camera lens, and θ can be an included angle between a connection line of a pixel dot and a center point of a camera lens and a horizontal line; Ls can be a radiation value of the pixel dot, and $A_s$ can be an occupied area of the pixel dot in the display panel.

Step S204, performing brightness compensation to the display panel according to the brightness value of the pixel dot after correction.

The foregoing step S204 can utilize the technical method according to prior art. The fourth preferred embodiment of the present invention has not limitations to the compensation method.

The technical result achieved by the first preferred embodiment of the present invention is introduced below with the work principle of the first preferred embodiment of the present invention. As regarding the compensation of prior art, the compensation is executed according to the brightness value $E_{dB,\theta°}$ of the pixel dot. According to the definition of the aforesaid formula, $E_{dB,\theta°}$ is proportional to $\cos^4\theta$, and according to the experience for the display panel, the values of the $\theta$ of all the pixel dots cannot be 0, and particularly for the edge positions of the liquid crystal panel, the $\theta$ can reach up to 10° or more than 10°. In case of 10°, the offset of the brightness decay is about merely 6%. The offset of the brightness decay might be further raised after the brightness compensation is executed according to $E_{dB,\theta°}$. Thus, how to eliminate or reduce the influence of the $\theta$ to the brightness value becomes the key of solving the offset of the brightness decay. The first preferred embodiment of the present invention divides the brightness value by the $f(\theta)$ to reduce the influence of the $\theta$ to the brightness decay. Specifically, the compensation is executed to the brightnesses of various view angles with the $f(\theta)$, and meanwhile, the influence of $\cos^4\theta$ to the brightness decay is reduced. Proved by the experiment, after the adjustment by utilizing the first preferred embodiment of the present invention, the brightness decay offset is obviously reduced, and it possesses the benefit of the brightness decay reduction.

Figure 4:
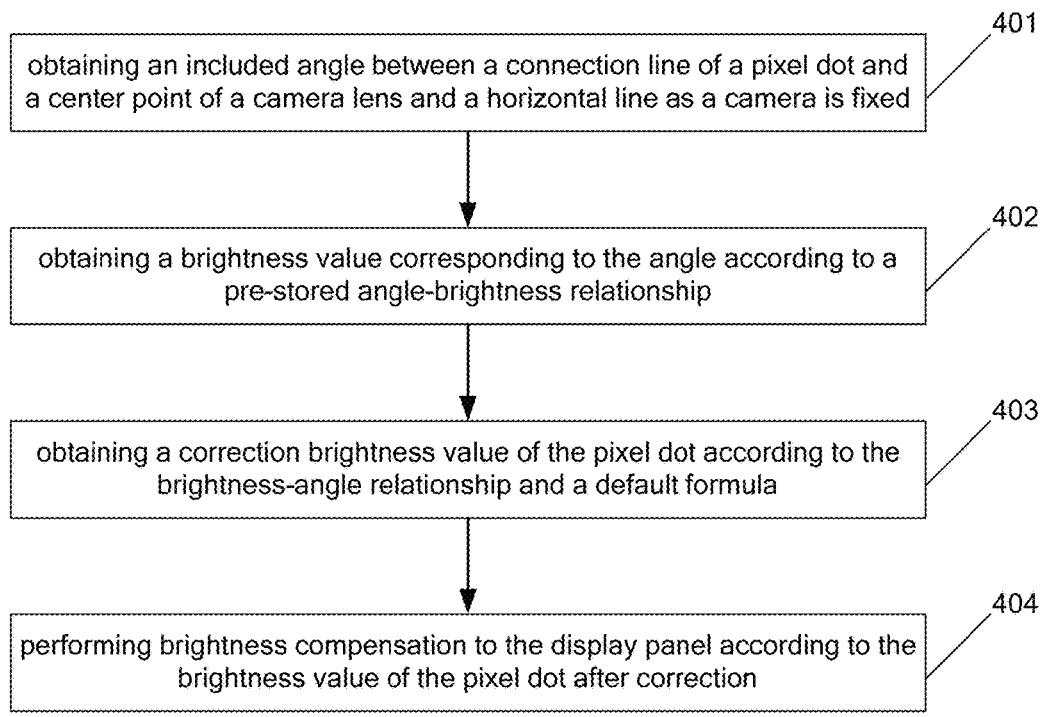
FIG. 4 is a flowchart of a brightness compensation method in a Demura system in the second preferred embodiment of the present invention.

Please refer to FIG. 4. FIG. 4 shows a brightness compensation method in a Demura system in the second preferred embodiment of the present invention. The method is accomplished with the display penal or the display device. The achievement of the second preferred embodiment of the present invention can be that a list of the angle-brightness is pre-stored in the display panel, and the acquisition of the list of the angle and brightness can comprises: the camera at the same position of the display panel obtains images from various positions (i.e. various angles) to obtain the mapping values of the angle and brightness at the same position from various angles. The mapping values are recorded to establish the list of angle and brightness. The method shown in FIG. 4 comprises steps of:

step S401, obtaining an included angle $\theta$ between a connection line of a pixel dot and a center point of a camera lens and a horizontal line as a camera is fixed;

The $\theta$ in the aforesaid step S401 as shown in FIG. 3, 10° is illustrated for the angle of the $\theta$ in FIG. 3. In practical application, the angle of the $\theta$ can be other values, such as 5°, 6°.

Step S402, obtaining a brightness value $f(\theta)$ corresponding to the $\theta$ according to a pre-stored angle and brightness list;

The aforesaid step S402 of obtaining a brightness value $f(\theta)$ corresponding to the $\theta$ according to a pre-stored angle and brightness list specifically can comprise:

if the $\theta$ can be queried in the pre-stored list of angle and brightness, then querying the $f(\theta)$ corresponding to the $\theta$ in the pre-stored list of angle and brightness;

if the $\theta$ cannot be queried in the pre-stored list of angle and brightness, then querying brightness values $f(\theta1)$ and $f(\theta2)$ corresponding to $\theta1$ and $\theta2$ adjacent the $\theta$ in the pre-stored list of angle and brightness, and calculating the $f(\theta)$ by interpolation.

the method of calculating the $f(\theta)$ by interpolation can be various. For instance, the calculation is executed by the mean interpolation, such as:

$$f(\theta) = \frac{f(\theta1) + f(\theta2)}{2}$$

certainly in the practical application, other interpolations can be employed to obtain the $f(\theta)$, and the second preferred embodiment of the present invention is not restricted to the specific implement of the aforesaid interpolation.

Step S403, obtaining a correction brightness value of the pixel dot according to a calculation of the $f(\theta)$ and a default formula;

$$Et_{dB,\theta°} = \frac{E_{dB,\theta°}}{f(\theta)};$$

$$E_{dB,\theta°} = \frac{Ls * A_s * \cos^4\theta}{Z^2}$$

$Et_{dB,\theta°}$ can be the brightness value of the pixel dot after correction, and $E_{dB,\theta°}$ can be a brightness value of the pixel dot before correction; Z can be a horizontal distance from a display panel to the center point of the camera lens, and $\theta$ can be an included angle between a connection line of a pixel dot and a center point of a camera lens and a horizontal line; Ls can be a radiation value of the pixel dot, and $A_s$ can be an occupied area of the pixel dot in the display panel.

Step S404, performing brightness compensation to the display panel according to the brightness value of the pixel dot after correction.

The foregoing step S404 can utilize the technical method according to prior art. The fourth preferred embodiment of the present invention has not limitations to the compensation method.

The technical result achieved by the second preferred embodiment of the present invention is introduced below with the work principle of the second preferred embodiment of the present invention. As regarding the compensation of prior art, the compensation is executed according to the brightness value $E_{dB,\theta°}$ of the pixel dot. According to the definition of the aforesaid formula, $E_{dB,\theta°}$ is proportional to $\cos t$, and according to the experience for the display panel, the values of the $\theta$ of all the pixel dots cannot be 0, and particularly for the edge positions of the liquid crystal panel, the $\theta$ can reach up to 10° or more than 10°. In case of 10°, the offset of the brightness decay is about merely 6%. The offset of the brightness decay might be further raised after the brightness compensation is executed according to $E_{dB,\theta°}$. Thus, how to eliminate or reduce the influence of the $\theta$ to the brightness value becomes the key of solving the offset of the brightness decay. The second preferred embodiment of the present invention divides the brightness value by the $f(\theta)$ to reduce the influence of the $\theta$ to the brightness decay. Proved by the experiment, after the adjustment by utilizing the second preferred embodiment of the present invention, the brightness decay offset is obviously reduced, and it possesses the benefit of the brightness decay reduction.

Figure 5:
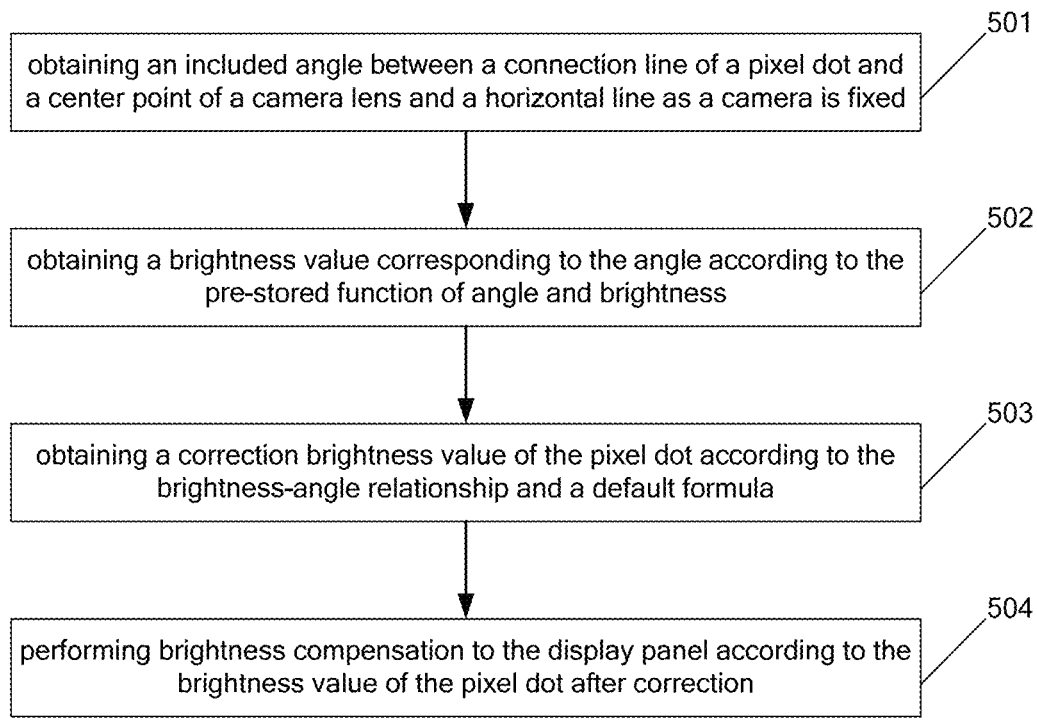
FIG. 5 is a flowchart of a brightness compensation method in a Demura system in the third preferred embodiment of the present invention.

Please refer to FIG. 5. FIG. 5 shows a brightness compensation method in a Demura system in the third preferred embodiment of the present invention. The method is accomplished with the display penal or the display device. The achievement of the second preferred embodiment of the present invention can be that a function of the angle-brightness is pre-stored in the display panel, and the acquisition of the function of the angle-brightness can comprises: the camera at the same position of the display panel obtains images from various positions (i.e. various angles) to obtain the mapping values of the angle and brightness at the same position from various angles. The mapping values are used to draw the synthetic curve to obtain the express form of the curve, i.e. the function of angle-brightness. The method shown in FIG. 5 comprises steps of:

step S501, obtaining an included angle $\theta$ between a connection line of a pixel dot and a center point of a camera lens and a horizontal line as a camera is fixed;

The $\theta$ in the aforesaid step S501 as shown in FIG. 3, 10° is illustrated for the angle of the $\theta$ in FIG. 3. In practical application, the angle of the $\theta$ can be other values, such as 5°, 6°.

Step S502, obtaining a brightness value $f(\theta)$ corresponding to the $\theta$ according to the pre-stored function of angle and brightness;

Step S503, obtaining a correction brightness value of the pixel dot according to a calculation of the $f(\theta)$ and a default formula;

$$Et_{dB,\theta°} = \frac{E_{dB,\theta°}}{f(\theta)};$$

$$E_{dB,\theta°} = \frac{Ls * A_s * \cos^4\theta}{Z^2}$$

$Et_{dB,\theta°}$ can be the brightness value of the pixel dot after correction, and $E_{dB,\theta°}$ can be a brightness value of the pixel dot before correction; Z can be a horizontal distance from a display panel to the center point of the camera lens, and $\theta$ can be an included angle between a connection line of a pixel dot and a center point of a camera lens and a horizontal line; Ls can be a radiation value of the pixel dot, and $A_s$ can be an occupied area of the pixel dot in the display panel.

Step S504, performing brightness compensation to the display panel according to the brightness value of the pixel dot after correction.

The foregoing step S504 can utilize the technical method according to prior art. The fourth preferred embodiment of the present invention has not limitations to the compensation method.

The technical result achieved by the third preferred embodiment of the present invention is introduced below with the work principle of the third preferred embodiment of the present invention. As regarding the compensation of prior art, the compensation is executed according to the brightness value $E_{dB,\theta°}$ of the pixel dot. According to the definition of the aforesaid formula, $E_{dB,\theta°}$ is proportional to $\cos^4\theta$, and according to the experience for the display panel, the values of the $\theta$ of all the pixel dots cannot be 0, and particularly for the edge positions of the liquid crystal panel, the $\theta$ can reach up to 10° or more than 10°. In case of 10°, the offset of the brightness decay is about merely 6%. The offset of the brightness decay might be further raised after the brightness compensation is executed according to $E_{dB,\theta°}$. Thus, how to eliminate or reduce the influence of the $\theta$ to the brightness value becomes the key of solving the offset of the brightness decay. The third preferred embodiment of the present invention divides the brightness value by the $f(\theta)$ to reduce the influence of the $\theta$ to the brightness decay.

Specifically, the compensation is executed to the brightnesses of various view angles with the $f(\theta)$, and meanwhile, the influence of $\cos^4\theta$ to the brightness decay is reduced. Proved by the experiment, after the adjustment by utilizing the third preferred embodiment of the present invention, the brightness decay offset is obviously reduced, and it possesses the benefit of the brightness decay reduction.

Figure 6:
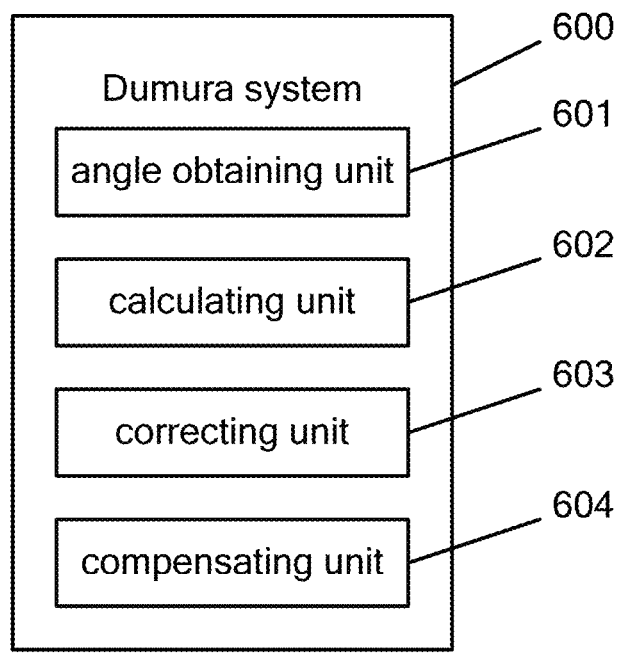
FIG. 6 is a structure diagram of a brightness compensation system in a Demura system in the fourth preferred embodiment of the present invention.

Please refer to FIG. 6. FIG. 6 shows a brightness compensation system in a Demura system in the fourth preferred embodiment of the present invention. The system shown in FIG. 6 comprises:

an angle obtaining unit 601, obtaining an included angle $\theta$ between a connection line of a pixel dot and a center point of a camera lens and a horizontal line as a camera is fixed;

and the $\theta$ in the angle obtaining unit 601 as shown in FIG. 3, 10° is illustrated for the angle of the $\theta$ in FIG. 3. In practical application, the angle of the $\theta$ can be other values, such as 5°, 6°.

a calculating unit 602, obtaining a brightness value $f(\theta)$ corresponding to the $\theta$ according to a pre-stored angle-brightness relationship;

The angle-brightness relationship in the aforesaid calculating unit 602 can have many express forms. The specific embodiment of the present invention does not restrict the specific express form of the angle-brightness relationship. For instance, in one embodiment of the fourth preferred embodiment of the present invention, the angle-brightness relationship can be the curve function of the angle-brightness relationship. Certainly, in the practical application, other embodiments can be utilized. As an illustration, the angle-brightness relationship is to establish the list of the angle-brightness relationship. Certainly, in the practical application, other express forms can be utilized. The repeated description is omitted here.

a correcting unit 603, obtaining a correction brightness value of the pixel dot according to a calculation of the $f(\theta)$ and a default formula, and the default formula comprises:

$$Et_{dB,\theta°} = \frac{E_{dB,\theta°}}{f(\theta)};$$

$$E_{dB,\theta°} = \frac{Ls * A_s * \cos^4\theta}{Z^2}$$

wherein $Et_{dB,\theta°}$ is the brightness value of the pixel dot after correction, and $E_{dB,\theta°}$ is a brightness value of the pixel dot before correction; Z is a horizontal distance from a display panel to the center point of the camera lens; Ls is a radiation value of the pixel dot, and $A_s$ is an occupied area of the pixel dot in the display panel;

a compensating unit 604, performing brightness compensation to the display panel according to the brightness value of the pixel dot after correction.

The compensation method of the foregoing compensating unit 604 can utilize the technical method according to prior art. The fourth preferred embodiment of the present invention has not limitations to the compensation method.

Selectably, the aforesaid angle-brightness relationship specifically can comprise:

a list of angle and brightness or a function of angle-brightness.

Selectably, as the relationship of the angle and the brightness comprises the list of angle and brightness, the calculating unit 602 is specifically employed for:

if the θ can be queried in the pre-stored list of angle and brightness, then querying the brightness value f(θ) corresponding to the θ in the pre-stored list of angle and brightness;

if the θ cannot be queried in the pre-stored list of angle and brightness, then querying brightness values f(θ1) and f(θ2) corresponding to θ1 and θ2 adjacent the θ in the pre-stored list of angle and brightness, and calculating the f(θ) by interpolation.

Selectably, as the relationship of the angle and the brightness comprises the function of angle-brightness, the calculating unit 602 is specifically employed for:

obtaining a brightness value f(θ) corresponding to the θ according to the pre-stored function of angle and brightness.

The technical result achieved by the fourth preferred embodiment of the present invention is introduced below with the work principle of the fourth preferred embodiment of the present invention. As regarding the compensation of prior art, the compensation is executed according to the brightness value $E_{dB,\theta°}$ of the pixel dot. According to the definition of the aforesaid formula, $E_{dB,\theta°}$ is proportional to $\cos^4 \theta$, and according to the experience for the display panel, the values of the θ of all the pixel dots cannot be 0, and particularly for the edge positions of the liquid crystal panel, the θ can reach up to 10° or more than 10°. In case of 10°, the offset of the brightness decay is about merely 6%. The offset of the brightness decay might be further raised after the brightness compensation is executed according to $E_{dB,\theta°}$. Thus, how to eliminate or reduce the influence of the θ to the brightness value becomes the key of solving the offset of the brightness decay. The fourth preferred embodiment of the present invention divides the brightness value by the f(θ) to reduce the influence of the θ to the brightness decay. Specifically, the compensation is executed to the brightnesses of various view angles with the f(θ), and meanwhile, the influence of $\cos^4 \theta$ to the brightness decay is reduced. Proved by the experiment, after the adjustment by utilizing the fourth preferred embodiment of the present invention, the brightness decay offset is obviously reduced, and it possesses the benefit of the brightness decay reduction.

Figure 7:
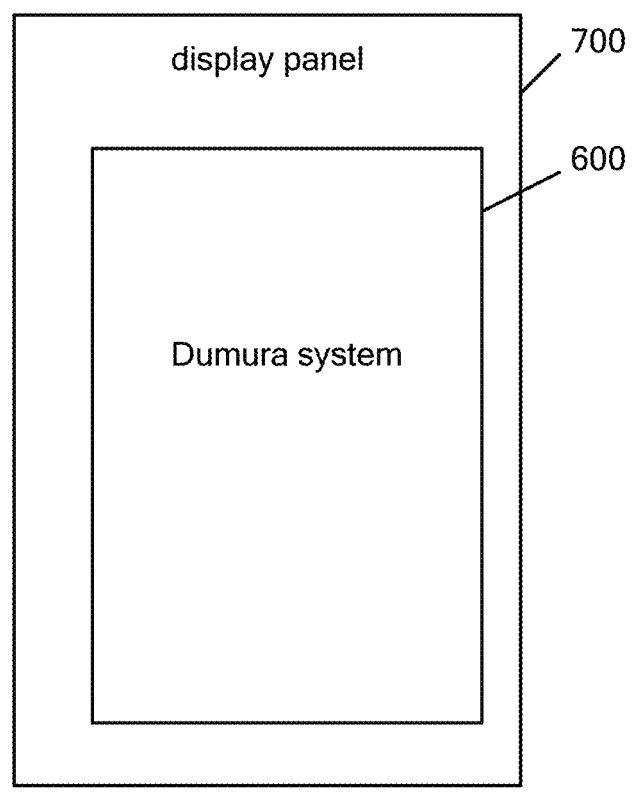
FIG. 7 is a structure diagram of a display panel provided by the specific embodiment of the present invention.

Besides, the specific embodiment of the present invention further provides a display panel. As shown in FIG. 7, the display panel 700 comprises a Demura system 600, and the Demura system comprises:

an angle obtaining unit 601, obtaining an included angle θ between a connection line of a pixel dot and a center point of a camera lens and a horizontal line as a camera is fixed; and the θ in the angle obtaining unit 601 as shown in FIG. 3, 10° is illustrated for the angle of the θ in FIG. 3. In practical application, the angle of the θ can be other values, such as 5°, 6°.

a calculating unit 602, obtaining a brightness value f(θ) corresponding to the θ according to a pre-stored angle-brightness relationship;

a correcting unit 603, obtaining a correction brightness value of the pixel dot according to a calculation of the f(θ) and a default formula, and the default formula comprises:

$$Et_{dB,\theta°} = \frac{E_{dB,\theta°}}{f(\theta)}$$

$$E_{dB,\theta°} = \frac{Ls * A_s * \cos^4 \theta}{Z^2}$$

wherein $Et_{dB,\theta°}$ is the brightness value of the pixel dot after correction, and $E_{dB,\theta°}$ is a brightness value of the pixel dot before correction; Z is a horizontal distance from a display panel to the center point of the camera lens; Ls is a radiation value of the pixel dot, and $A_s$ is an occupied area of the pixel dot in the display panel;

a compensating unit 604, performing brightness compensation to the display panel according to the brightness value of the pixel dot after correction.

The compensation method of the foregoing compensating unit 604 can utilize the technical method according to prior art. The fourth preferred embodiment of the present invention has not limitations to the compensation method.

Selectably, the aforesaid angle-brightness relationship specifically can comprise:

a list of angle and brightness or a function of angle and brightness.

Selectably, as the relationship of the angle and the brightness comprises the list of angle and brightness, the calculating unit 602 is specifically employed for:

if the θ can be queried in the pre-stored list of angle and brightness, then querying the brightness value f(θ) corresponding to the θ in the pre-stored list of angle and brightness;

if the θ cannot be queried in the pre-stored list of angle and brightness, then querying brightness values f(θ1) and f(θ2) corresponding to θ1 and θ2 adjacent the θ in the pre-stored list of angle and brightness, and calculating the f(θ) by interpolation.

Selectably, as the relationship of the angle and the brightness comprises the function of angle-brightness, the calculating unit 602 is specifically employed for:

obtaining a brightness value f(θ) corresponding to the θ according to the pre-stored function of angle and brightness.

Besides, the specific embodiment of the present invention further provides a display device, and the display device comprises a display panel, and the display panel comprises a Demura system, and the specific structure of the Demura system can be referred to the description of the fourth preferred embodiment of the present invention. The repeated description is omitted here.

It should be noted that, for each of the aforementioned embodiments of the method, for simplifying description, it is expressed as a combination of a series of actions. Nevertheless, the skilled person in this art should understand that the present invention is not limited to the described operation sequence because some steps can be employed in other order sequentially or simultaneously according to the present invention. Secondly, those skilled persons in this art should understand that the implements and the embodiments described in the specification are all the preferred embodiments, and the involved operations and units of the present invention should not be not essential.

In the foregoing embodiments, the description of the various embodiments have respective different emphases, and a part in some embodiment, which is not described in detail can be referred to the related description of other embodiments.

The steps in the method according to the embodiment of the present invention can be order adjusted, divided or deleted according to the actual requirements.

The units in the device according to the embodiment of the present invention can be merged, divided or deleted according to the actual requirements. Those skilled persons in this art can bind or combine various embodiments and features of different embodiments described in the specification.

With the descriptions in the aforesaid embodiments, those skilled persons in this art can understand that the present invention may be achieved by implementing in hardware or firmware, or a combination thereof. When the software is used for achievement, the aforesaid function can be stored in the computer readable medium or can be one or more instructions or codes in the computer readable medium for transmission. The computer readable medium comprises the computer storage medium and communication medium, wherein the communication medium includes any mediums transmitting the computer program from one place to another place. The storage medium can be any possible medium which can be accessed by the computer. The samples are illustrated but not limited thereto: the computer readable medium can comprise Random Access Memory (RAM), Read-Only Memory (ROM), Electrically Erasable Programmable Read-Only Memory (EEPROM), Compact Disc Read-Only Memory (CD-ROM) or other storage optical Discs, magnetic disc storage medium or other magnetic storage devices, or any other mediums which can carry or store the expected program codes having instructions or data structure forms and can be accessed by the computer. Besides, any computer readable mediums which are properly connected can be illustrated. For instance, if the software is transmitted from the website, server or other remote source through the coaxial cable, fiber optic cable, twisted pair, Digital Subscriber Line (DSL) or the wireless technologies, such as infrared, radio, and microwave, then the coaxial cable, fiber optic cable, twisted pair, Digital Subscriber Line (DSL) or the wireless technologies, such as infrared, radio, and microwave should be included in the definition of the mediums. As used in the present invention, the Disk and the disc comprises the compact disc (CD), laser disc, optical disc, Digital Versatile Disc (DVD), soft disk and blue-ray disc, wherein the disk contains the magnetic copy data, and the disc contains the optical copy data read by laser. The foregoing combinations should be included in the protective scope of the computer readable mediums.

In sum, the previous description is merely the preferred embodiment of the technical solution of the present invention rather than the restriction to the protective scope of the present invention. Any modification, equivalent replacement or improvement within the spirit and principles of the present invention should be included within the protective scope of the present invention.

What is claimed is:

1. A brightness compensation method in a Demura system of a display panel, wherein the method comprises:
    obtaining an included angle $\theta$ between a connection line of a pixel dot of the display panel and a center point of a camera lens and a horizontal line as a camera is fixed, the pixel dot of the display panel being located on an object side of the camera;
    obtaining a brightness value $f(\theta)$ corresponding to the angle $\theta$ according to a pre-stored angle-brightness relationship;
    obtaining a correction brightness value of the pixel dot of the display panel according to a calculation operation of the brightness value $f(\theta)$ and the following equations:

$$Et_{dB,\theta°} = \frac{E_{dB,\theta°}}{f(\theta)}$$

$$E_{dB,\theta°} = \frac{Ls * A_s * \cos^4\theta}{Z^2}$$

wherein $Et_{dB,\theta°}$ is the brightness value of the pixel dot of the display panel after correction, and $E_{dB,\theta°}$ is a brightness value of the pixel dot of the display panel before correction; Z is a horizontal distance from the display panel to the center point of the camera lens; Ls is a radiation value of the pixel dot, and $A_s$ is an occupied area of the pixel dot in the display panel; and
    performing brightness compensation to the display panel according to the brightness value of the pixel dot after correction.

2. The method according to claim 1, wherein the pre-stored angle-brightness relationship comprises one of a list of angle and brightness and a function of angle-brightness.

3. The method according to claim 2, wherein the pre-stored angle-brightness relationship of comprises the list of angle and brightness, and the step of "obtaining a brightness value $f(\theta)$ corresponding to the angle $\theta$ according to a pre-stored angle-brightness relationship" comprises:
    if the angle $\theta$ is identifiable in the list of angle and brightness, retrieving the brightness value $f(\theta)$ corresponding to the angle $\theta$ in the list of angle and brightness; otherwise
    retrieving brightness values $f(\theta 1)$ and $f(\theta 2)$ corresponding to angles $\theta 1$ and $\theta 2$ adjacent the $\theta$ in the list of angle and brightness, and calculating the brightness value $f(\theta)$ by interpolation.

4. The method according to claim 2, wherein the pre-stored angle-brightness relationship comprises the function of angle-brightness, and the step of "obtaining a brightness value $f(\theta)$ corresponding to the angle $\theta$ according to a pre-stored angle-brightness relationship" specifically comprises:
    Obtaining the brightness value $f(\theta)$ corresponding to the angle $\theta$ according to the function of angle-brightness.

* * * * *